United States Patent [19]
van de Heisteeg et al.

[11] Patent Number: 5,863,322
[45] Date of Patent: Jan. 26, 1999

[54] ADHESIVE COMPOSITIONS COMPRISING WATER GLASS, AN OLIGOSACCHARIDE, AND A MONO-, DI- OR TRI-SACCHARIDE

[75] Inventors: Bartholomeus Johannes Jozef van de Heisteeg, Vries; Bouke Dirk Froentjes, Veendam, both of Netherlands

[73] Assignee: Akzo-PQ Silica Vof, Amersfoort, Netherlands

[21] Appl. No.: 935,471

[22] Filed: Sep. 24, 1997

[30]  Foreign Application Priority Data

Sep. 26, 1996 [EP] European Pat. Off. .............. 96202688

[51] Int. Cl.⁶ .................................................. C09J 103/02
[52] U.S. Cl. ................... 106/617; 106/205.9; 106/217.3; 106/217.9; 106/287.1; 162/175; 162/181.7; 428/537.5
[58] Field of Search ..................... 106/617, 618, 106/619, 217.01, 217.3, 205.9, 217.9, 287.1; 162/175, 181.7; 428/537.5

[56] References Cited

U.S. PATENT DOCUMENTS

| | | | |
|---|---|---|---|
| 606,751 | 7/1898 | Weintraub-Schnorr | 106/617 |
| 2,078,836 | 4/1937 | Carter | 106/617 |
| 3,433,691 | 3/1969 | Reese | 156/195 |
| 3,767,440 | 10/1973 | Olix | 106/214 |
| 5,571,316 | 11/1996 | Gill | 106/617 |
| 5,776,242 | 7/1998 | Gill et al. | 106/617 |

FOREIGN PATENT DOCUMENTS

| | | | |
|---|---|---|---|
| 440870 | 4/1941 | Belgium . | |
| 2646969 | 4/1978 | Germany | C09J 1/02 |
| 86177 | 2/1985 | Romania | B22C 1/16 |

OTHER PUBLICATIONS

European Search Report, Mar. 5, 1997.

*Primary Examiner*—Michael Marcheschi
*Attorney, Agent, or Firm*—Ralph J. Mancini

[57] ABSTRACT

The invention pertains to adhesive compositions comprising water glass, at least one oligosaccharide with more than three saccharide units, and at least one mono-, di- or tri-saccharide. Preferably, the oligosaccharide is a low-molecular weight dextrin. Such compositions demonstrate not only a high curing rate and a good wet tack, but also an excellent storage stability. The compositions are useful as a glue or sizing agent. When they are used as a glue, improved crush values of the finished products are observed.

12 Claims, No Drawings

ADHESIVE COMPOSITIONS COMPRISING WATER GLASS, AN OLIGOSACCHARIDE, AND A MONO-, DI- OR TRI-SACCHARIDE

FIELD OF THE INVENTION

The present invention pertains to adhesive compositions for paper, cardboard, and other paper or paper-like products that comprise water glass, at least one oligosaccharide in a concentration of at least 2% by weight on the total composition, and a third component.

BACKGROUND OF THE INVENTION

There is a demand for adhesives, especially of the kind used for cementing or sizing cardboard and paper, with an increased dry solid weight content and good storage stability. An increased dry solid weight content will not only result in faster curing rates but also leads to reduced water uptake by the substrates to be cemented. Typically, fillers are added to increase the dry solid weight content. However, these fillers reduce the "wet tack" and the curing rate. Moreover, such formulations often are not storage stable at ambient temperature and have a too high viscosity for normal processing. The poor storage stability typically manifests itself in the floating out of one or more of the ingredients. In the case of known water glass-dextrin products, very often the dextrin floats out. Also, the use of solid fillers in the formulation is less desired, because such a solid, especially when used in a high quantity, may settle during storage and because it may affect the equipment. Since it often is an abrasive, it may for instance cause an increased wear of the pumps.

Moreover, there is a need for cemented articles with a higher crush value than is presently obtained when, for instance, plain water glass is used as the adhesive. Such higher crush values will allow the use of thinner-walled articles, with attendant savings.

Therefore, there is still a need for new water glass based adhesive compositions with improved properties.

It is noted that U.S. Pat. No. 3,767,440 discloses a composition comprising water glass, dextrin, and a clay slurry. It is stated that known formulations containing water glass and more than 0.5% of dextrin, as in, for instance, U.S. Pat. No. 3,343,691, are not storage stable. This reference teaches to use 4.5–12 % by weight of a clay slurry in the formulation to improve the storage stability. As mentioned above, such a high qauntity of a solid filler is not desired. It is not disclosed or suggested to use a composition comprising a mono-, di- and/or tri-saccharide to improve the performance and the storage stability.

SUMMARY OF THE INVENTION

As the present invention generally relates to a paper adhesive composition comprising water glass, at least one oligosaccharide in a concentration of at least 2% by weight on the total composition, and a third component, characterized in that the third component is at least one mono-, di- and/or tri-saccharide.

DETAILED DESCRIPTION OF THE INVENTION

In accordance with the present invention, it has now surprisingly been found, after extensive research and experimentation, that storage stable adhesive compositions with an increased dry solid weight content and a corresponding faster curing rate can be composed without adversely affecting the wet tack or the viscosity. On the contrary, the wet tack is even improved.

The invention is characterized in that the third component is at least one mono-, di- and/or tri-saccharide.

It is noted that BE 440870 discloses an adhesive comprising water glass, $CaCO_3$ as a solid filler, and sugar syrup. The sugar syrup is said to retard the curing of the adhesive and to interact with the solid filler. Hence, this document does not disclose or suggest compositions according to the invention showing a good wet-tack, fast curing rates, and excellent storage stability.

Furthermore, German patent application 26 46 969 discloses adhesive compositions where a sugar is dissolved in water glass at a concentration between 0.05 and 2% by weight. Sucrose and sorbitol are the preferred sugars. These compositions are said to have an improved curing rate, resulting in less fraying of the paper tubes when they are cut after production. However, such compositions do not have the desired dry solid weight content. It is also observed that increasing the dry solid weight content by increasing the sugar level, for all that it leads to an acceptable wet tack, is not practical because the curing rate is reduced too much. It appears that the sugar in the formulation retains too much of the moisture. According to this patent application, the formulations can optionally comprise an alkaliphosphate.

In the adhesive compositions according to the invention, various oligosaccharides can be applied. The term oligosaccharide as used herein is meant to encompass all carbohydrates with more than three monosaccharide units in one molecule. The upper limit for the number of monosaccharide units will depend on various factors, for instance, the types of monosaccharide units and the maximum acceptable viscosity, as discussed hereinafter. Typical, non-limiting, examples of such oligosaccharides are starch derivatives like dextrin, carboxymethyl cellulose (CMC), hydroxyethyl cellulose (HEC), and the like. The preferred oligosaccharide is dextrin, which is a mixture of oligosaccharides with varying numbers of monosaccharide units. A low-molecular weight dextrin is preferred for its high water-solubility, allowing a higher dry solid weight content of the composition, while the viscosity of the composition is still such that it can be processed. Such a low-molecular weight dextrin is characterized by an Ostwald viscosity below 45 mPa.s (at 25° C., of a solution in water of 355 g/kg of dry solids). It is preferred to use at least 5% w/w of an oligosaccharide. More preferably, at least 5% w/w of a low-molecular weight dextrin is used. Most preferred are compositions comprising more than 10% w/w of low-molecular weight dextrin.

In the compositions according to the invention, water glass with a $SiO_2:Na_2O$ ratio between 2 and 4 and a dry solid content between 15 and 50% w/w can be used. However, other types of water glass may also be used, depending on the specific use of the adhesive composition. In a most preferred embodiment, the water glass in the composition has a dry solid weight content of at least 38% w/w.

Of the mono-, di- and/or tri-saccharides that can be used in the composition according to the invention, sucrose is preferred. Preferably, the mono-, di-, tri-saccharides, or mixtures thereof are present in a concentration of at least 2% w/w on the total composition. More preferably, they are used in concentrations of at least 5% w/w.

Most preferred are compositions comprising water glass, at least 5% w/w of a low molecular weight dextrin, and at least 5% w/w of sucrose.

Depending on the type of equipment used to produce and/or dispense the adhesive composition, there may be restrictions as to the viscosity of the composition that is to be used. Obviously, the lower viscosity boundary will not form a problem. However, depending on the equipment used, the viscosity may exceed the maximum acceptable value. In the latter case, dextrin of lower-molecular weight or, alternatively, compositions with a lower dry solid weight content are recommended, provided that the final concentration of the oligosaccharide in the composition remains greater than 2% w/w. To reduce the dry solid eight content, the composition is diluted with water, or the amount of dextrin and/or sugar is reduced. It is also possible to reduce the dry solid weight content by using a water glass with a lower dry solid weight content (with a lower specific gravity). Preferably, the viscosity of the composition ranges from 100 to 5000 mPa.s at 20° C. when measured with a Brookfield RVF at 20 $min^{-1}$. More preferably, the viscosity ranges from 300 to 2500 mPa.s at 20° C. Most preferred are compositions with a viscosity in the range of 400 to 1250 mPa.s at 20° C.

The adhesive compositions according to the invention may also contain one or more pH controlling agents such as caustic soda, alkali metal carbonate, alkali metal borate, alkali metal hydrogen phosphate, and alkali metal phosphate. It is preferred to use such pH controlling agents in the preparation of a dextrin solution, since they typically facilitate the mixing of the dextrin and the water glass and also have a positive effect on the viscosity and the storage stability of the adhesive composition. Alternatively, a borated dextrin can be used to control the pH. If a dextrin solution is used to prepare an adhesive composition according to the invention, the pH of this dextrin solution preferably is above 7, more preferably above 8, and most preferably above 9. Preferably, $K_2CO_3$ is used to adjust the adhesive compositions according to the invention, since it proved to be most effective. The pH of the adhesive composition preferably is between 10.5 and 13.5, to ensure that no material will separate during a storage period of at least one month. Preferably, the adhesive compositions are storage stable for more than three months, while a storage stability of more than six months is most preferred.

Optionally, the adhesive compositions contain adjuvants such as lignin; lecithin; cross-linking agents, e.g. siliconates; polyalcohols, e.g. glycerin; inert fillers (e.g. chalk, urea, and clays like bentonite and kaolin); thickeners, e.g. xanthane gum, Arabic gum, and alginates; and dextrin-stabilized polyvinyl acetate (PVAc) dispersions. Preferably, such adjuvants are soluble in the final composition according to the invention. When such adjuvants are used, for instance in adhesives for high-speed tube winding processes, it is preferred to use a dextrin-stabilized polyvinyl acetate to further improve the flexibility and hence the machinability of the finished articles.

The adhesive compositions according to the invention exhibit a wet tack equal to or greater than the wet tack of plain 38/40 water glass. The wet tack in this connection is defined as the stripping energy, measured with the Adhesion Tester as described under "procedure 1" in this document, after 0 minutes of open time and 15 seconds of closed time. If the wet tack is insufficient, the amount of dextrin and/or the amount of saccharide in the composition is to be increased.

More preferably, the adhesive compositions not only have an acceptable wet tack, but also a curing rate sufficient to give a paper stripping energy greater than 0.60 J after 0 seconds of open time and 45 seconds of closed time, measured in accordance with the aforementioned procedure 1.

When the adhesive compositions according to the invention are applied, the water in the composition is partially absorbed by the substrate. Upon subsequent drying, the substrate may be affected by this water. Thus, the substrate may become warped, wrinkle, a show bubbles, or the like. In order to avoid such effects, it is preferred to have compositions with a high dry solid weight content. Moreover, drying will take a shorter time whenever the dry solid weight content is increased. Therefore, the dry solid weight content is preferably as high as possible. More specifically, a dry solid weight content of at least 43% w/w is preferred. Most preferred is a dry solid weight content of more than 50% w/w.

In a further embodiment, the invention relates to the use of adhesive compositions comprising water glass, one or more oligosaccharides, and one or more mono-, di- or tri-saccharides as a glue or sizing agent. Preferably, use is made of adhesive compositions which comprise more than 70% w/w of water glass with a dry solid weight content of at least 38% w/w, more than 2% w/w of dextrin, and more than 5% w/w of one or more mono-, di- or tri-saccharides. Most preferred are compositions comprising water glass, dextrin, and sucrose. The adhesive compositions are used in both hot and cold processes, to manufacture paper, cardboard or paper-like products. Compositions according to the invention have been used with good results in processes where temperatures from 10° to 70° C. are applied, but their application is not limited to this range.

In a further embodiment, the invention pertains to articles, for example, paper tubes, honeycomb corrugated board, and the like, produced using an adhesive composition according to the present invention. Compared with articles of the prior art, the articles according to the invention have a higher crush strength. It was found that the use of said adhesive compositions leads to 10–25% higher crush values. For example, articles produced with plain water glass with a crush value of 1000N were observed to have a crush value of about 1200N when an adhesive according to the invention was used. If the strength of the article is not to be augmented, a thinner-walled article, with attendant cost-savings, is feasible when it is produced according to the invention.

The compositions according to the invention are useful as glue or sizing agents for paper, cardboard or other paper or paper-like products, since they combine a higher solids content, an increased wet tack, an increased curing rate, and good machinability with excellent storage stability when compared with the currently used adhesives. Moreover, they are also suitable for the production of foundry cores and moulds. The compositions are pre-eminently suited for use in cardboard tube winding processes. Since the compositions comprise water glass, dextrin, and saccharide(s), they can be classified as environmentally friendly.

The invention is illustrated by the following examples

EXPERIMENTAL

Materials used

Water glass 38/40, with a density of 1,35–1,38 kg/l, supplied by Akzo-PQ Silica Vof Low-molecular weight dextrin type AVEDEX® 28 La 21, ex Avebe Sucrose ex CSU (Centrale Suiker Unie) with a purity of 99.95%

All other chemicals were technical grade products of Baker.

Procedures

1. The paper stripping energy is determined with the aid of a STRÖHLEIN® Adhesion Tester, which procedure is recognized by the Fipago (Fédération Internationale des Fabricants de Papier Gommes). The value for the stripping energy depends on the type of paper used in the tests and on the experimental conditions, like temperature, humidity, and the thickness of the glue layer. The values as presented throughout this document were determined as follows:

The test liner, being the paper attached to the base, was of the "testing paper 8283" type and can be obtained from Retsch (NL). The paper on the pendulum was of the MG-kraft type and supplied as "Velenhendaye S (70 g)" by Gascoinge (FR). The smooth side of the MG-kraft paper is cemented to the test liner with 80 g.m$^{-2}$ of adhesive composition. The dimensions of the test liner were: length 100 mm, width 60 mm. The dimensions of the MG-kraft paper were: length 300 mm, width 30 mm. The test conditions were: temperature 23° C. and relative humidity 50%. For reference purposes, a standard sodium water glass (38/40 water glass) with a specific gravity of 1,38–1,41 kg/l, containing about 9,0% w/w $Na_2O$ and about 29,6% w/w $SiO_2$, gave a stripping energy of 0.15–0.20 J under the conditions used.

2. The adhesive compositions were produced as follows:
   2.1 A solution of dextrin and specified pH controlling agent in water was made by mixing these ingredients in the amounts as defined below, and subsequent dissolution at 85° C.
   2.2 In a separate vessel, the mono-, di- and/or trisaccharide(s) were dissolved in the water glass at a temperature of 30° C.
   2.3 The solution of 2.1 was combined with the solution of 2.2.
   2.4 If so desired, a little water was added to control the viscosity.

Example 1

A dextrin solution was made using 3 kg water, 11.25 kg dextrin, and 0.75 kg potassium carbonate. Using this dextrin solution in combination with a solution of 74 kg water glass 38/40, 10 kg sucrose, and 1 kg NaOH gave an adhesive composition according to the invention.

The wet tack of this adhesive composition was 0.16 J, while after 45 seconds in the adhesion test a paper stripping energy (PSE45) of 0.70 J was obtained. The viscosity of the adhesive composition was 500±100 mPa.s at 20° C., the dry solid weight content was 53.0±1.5%, and the pH was 11.5. This adhesive composition was storage stable for more than six months.

Comparative Examples A–C

In these examples, various amounts of sucrose were dissolved in 38/40 water glass. Oligosaccharides were not used. The following results were obtained:

| Example | Sucrose (% w/w) | Wet tack (J) | PSE45 (J) | Viscosity (mPa · s) |
| --- | --- | --- | --- | --- |
| A | 0 | 0.09 | 0.14 | 110 |
| B | 2 | 0.09 | 0.08 | 130 |
| C | 9 | 0.14 | 0.36 | 170 |

Formulations with a higher sucrose level did not solidify in an acceptable time span, due to water retention.

We claim:

1. A paper adhesive composition comprising water glass, at least one oligosaccharide in a concentration of at least 2% by weight based on the total composition, and at least 5% by weight based on the total formulation of a third component, wherein the third component comprises at least one monosaccharide, disaccharide, trisaccharide or mixtures thereof.

2. The composition of claim 1 which comprises oligosaccharide in an amount of from between 5 and 25% by weight based on the total composition.

3. The composition of claim 1 wherein the oligosaccharide is a low-molecular weight dextrin.

4. The composition of claim 1 wherein the third component is sucrose.

5. The composition of claim 1 wherein the composition has a solids content of greater than 43% by weight.

6. The composition of claim 1 further comprising a pH controlling agent.

7. A method for improving the storage stability and strength of a water glass based paper adhesive or paper sizing agent which comprises adding to said adhesive, or paper sizing agent one or more oligosaccharides, and at least 5% by weight of at least one monosaccharide, disaccharide, trisaccharide or mixtures thereof.

8. The method of claim 7 wherein the oligosaccharide is dextrin.

9. The method of claim 8 wherein the dextrin is a low-molecular weight dextrin which is present in an amount of more than 2% by weight based on the total composition.

10. A process for manufacturing paper, cardboard or paper or cardboard based products said process comprising the use of an adhesive composition according to claim 1.

11. A paper, cardboard or paper or cardboard based product prepared in accordance with the process of claim 10.

12. The composition of claim 1 wherein the composition has a solids content of greater than 50% by weight.

* * * * *